Feb. 24, 1970    A. WINKLER ET AL    3,496,849
PHOTOGRAPHIC CAMERA WITH AUTOMATIC EXPOSURE CONTROL
Filed Dec. 22, 1967
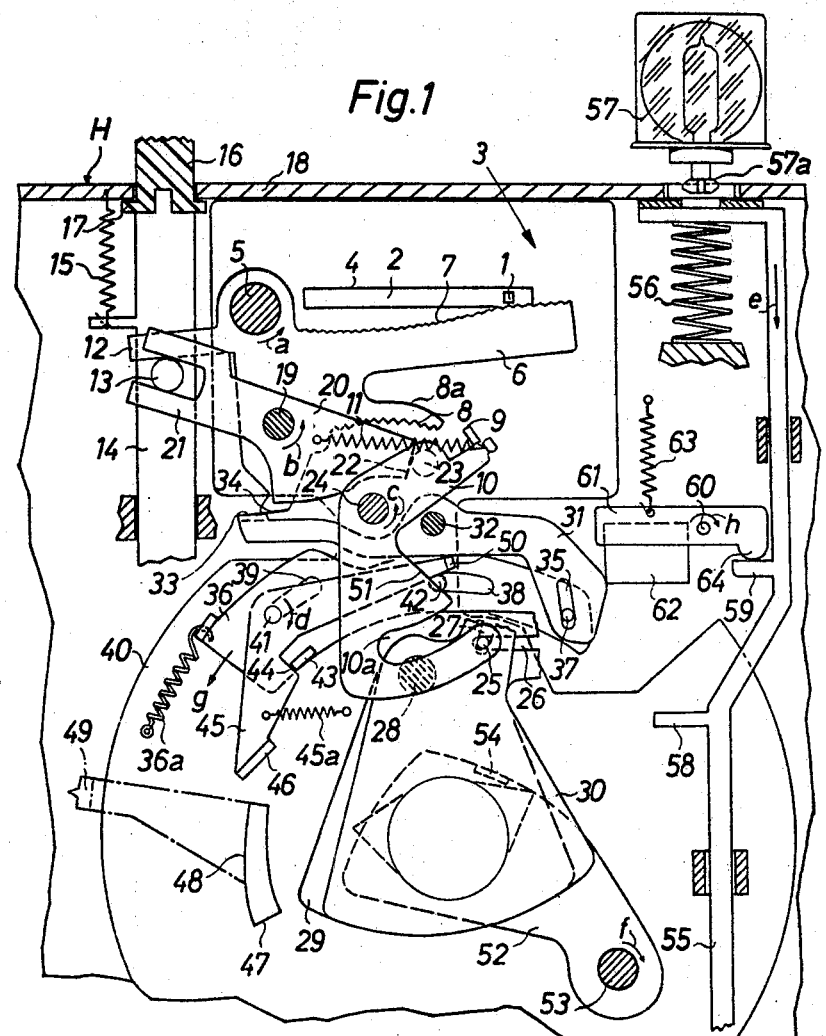
INVENTORS
ALFRED WINKLER
DIETER ENGELSMANN
BY
Michael S. Striker
Attorney

3,496,849
PHOTOGRAPHIC CAMERA WITH AUTOMATIC EXPOSURE CONTROL

Alfred Winkler, Munich, and Dieter Engelsmann, Unterhaching, Germany, assignors to Agfa-Gavaert Aktiengesellschaft, Leverkusen, Germany
Filed Dec. 22, 1967, Ser. No. 692,733
Claims priority, application Germany, Dec. 24, 1966,
A 54,471
Int. Cl. G01j 7/12
U.S. Cl. 95—10                                 10 Claims

ABSTRACT OF THE DISCLOSURE

A photographic camera with built-in exposure meter and flash unit wherein the exposure time is set automatically when the multiple flash bulb holder of the flash unit is attached to a socket in the housing of the camera. The setting edvice which sets the exposure time also changes the sensitivity of the exposure meter, either by disconnecting a resistor from the exposure meter circuit or by changing the position of a mask with reference to the light-sensitive receiver of the exposure meter when the multiple flash bulb holder is connected to the socket. When the intensity of scene light is insufficient for satisfactory exposures in daylight, the diaphragm is automatically connected with the focussing member in such a way that the aperture size varies as a function of adjustment of the focussing member, i.e., not as a function of the intensity of scene light.

BACKGROUND OF THE INVENTION

The present invention relates to improvements in cameras of the type having a built-in exposure meter and a built-in illuminating arrangement. More particularly, the invention relates to improvements in cameras wherein the exposure time and/or the size of the diaphragm aperture is determined automatically as a function of the intensity of scene light when the camera is used in daylight and wherein at least one exposure value is determined automatically when the camera is used with a flash unit or another suitable source of artificial light.

It is already known to provide a camera with a setting device which inactivates the exposure meter in response to placing of an illuminating arrangement into operative condition, for example, in response to attachment of a multiple flash bulb holder. The setting device then establishes an operative connection between the focus adjusting means and the diaphragm as a function of the guide number of the illuminating arrangement. At the same time, the setting member can adjust the shutter to furnish an exposure time which is satisfactory for exposure with artificial illumination of the subject.

It is also known to provide a camera with a device which establishes an operative connection between the focussing means and the diaphragm when the exposure meter indicates that the intensity of scene light is unsatisfactory. Such device may include a transmission. The purpose of the transmission is to insure that the user need not perform any manipulations which could lead to unsatisfactory exposures. However, a serious drawback of such cameras is that they cannot be used for artificial illumination of the subject or scene in daylight. This might become necessary when the user wishes to eliminate pronounced shadows while making an exposure in satisfactory daylight.

SUMMARY OF THE INVENTION

It is an object of the present invention to provide a photographic camera with built-in exposure meter which can be used for exposures in daylight or artificial light and which can also be used for exposures in daylight with additional illumination of the subject or scene by a flash bulb or the like.

Another object of the invention is to provide a camera wherein the automatic exposure meter is not disconnected when the user decides to use a flash bulb or the like in satisfactory daylight.

A further object of the invention is to provide a camera wherein the exposure time is selected automatically in response to attachment of a flash bulb or a multiple flash bulb holder and wherein the sensitivity of the exposure meter is automatically adjusted to account for the selected exposure time when the camera is used in daylight with additional illumination of the subject by an illuminating arrangement.

Our invention is embodied in a photographic camera, particularly a still camera, which comprises a housing accommodating an adjustable diaphragm assembly and an adjustable shutter assembly, an automatic exposure meter having an output portion (e.g. the needle of a moving coil instrument) which is movable between a plurality of positions as a function of the intensity of scene light, sensing means movable into engagement with the output portion in response to actuation of the shutter release, first adjusting means preferably comprising a lever pivotable about a fixed axis and controlled by the sensing means to adjust the shutter assembly and/or the diaphragm assembly as a function of the intensity of scene light when such intensity exceeds a predetermined minimum value below which the intensity is unsatisfactory for exposures without artificial illumination, manually operated focussing means, second adjusting means controlled by the sensing means and operative to establish a connection between the focussing means and one of the assemblies (for example, between the focussing means and the diaphragm assembly so that the size of the diaphragm aperture can be changed in response to adjustment of focussing means and not as a function of the intensity of scene light when the intensity of scene light is below the predetermined minimum value), setting means movable from a first position to a second position to thereby adjust one of the assemblies (preferably the shutter assembly so that the latter furnishes a predetermined exposure time), illuminating means having a portion movable to an operative position to thereby move the setting means to second position (for example, such illuminating means may comprise a built-in flash unit using multiple flash bulb holders whereby the setting means is moved to second position when the plug of the multiple flash bulb holder is attached to a socket or a like receptacle in the housing of the camera), and third adjusting means for adjusting the sensitivity of the exposure meter in response to movement of setting means to second position so that the exposure meter is capable of effecting adjustment of the diaphragm as a function of the intensity of scene light and by taking into consideration the exposure time selected by the setting means when the camera is to be used in daylight and with artificial illumination of the subject.

The third adjusting means may comprise a resistor which is normally connected in the electric circuit of the exposure meter means but is disconnected from such circuit by an arm on the setting means when the latter moves to second position. Alternatively, the third adjusting means may comprise a mask which overlies a first portion of a light-sensitive receiver in the circuit of the exposure meter means in the first position of the setting means but is caused by the setting means to change its position with reference to the receiver when the setting means moves to second position.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic fragmentary vertical sectional view of a still camera which embodies one form of our invention; and FIG. 2 is a schematic detail view of a portion of a modified camera.

DESCRIPTION OF THE PREFERRED EMBODIMENTS

FIG. 1 illustrates a portion of a still camera which comprises an exposure meter whose sensitivity is adjustable. The exposure meter comprises a light-sensitive receiver 62 and a moving-coil instrument whose output member or needle is shown at 1. This needle is movable in a slot 2 provided in a back support 3 resembling a plate mounted in the housing H of the camera. The edge face 4 bounding the upper side of the slot 2 can cooperate with a serrated edge face 7 of a sensing member or lever 6 which is pivotable on a pin 5 mounted in the housing H. The sensing member 6 is further provided with a second serrated edge face 8. This latter edge face 8 can be engaged by a follower 9 provided on a first adjusting member here shown as a lever 10 which can adjust the diaphragm assembly of the camera. A helical spring 11 operates between the adjusting lever 10 and sensing member 6 to bias a projection or arm 12 of the sensing member against a post 13 provided on a reciprocable shutter release 14. The latter has a knob 16 which extends upwardly through a cutout provided in the top wall 18 of the housing H. The shutter release 14 is biased upwardly to starting position by a helical return spring 15 and is provided with a flange 17 which bears against the underside of the top wall 18 when the spring 15 is free to contract so that the shutter release 14 is properly located in its starting position.

A resetting lever 20 is pivotable on a fixed pin 19 and has a bifurcated arm 21 which straddles the post 13 of the shutter release 14. The resetting lever 20 is further provided with an edge face 22 which cooperates with a stop pin 23 on the adjusting lever 10. The latter is pivotable on a fixed pin 24 and carries an adjusting portion or pin 25 which extends into slots 26, 27 provided in diaphragm blades 29, 30. These blades are turnable on a pivot pin 28. A second adjusting lever 31 is pivotable on a pin 32 and has a projection or nose 33 which cooperates with an edge face 34 of the sensing member 6. This second adjusting lever 31 has a slot 35 for a pin 37 provided on a segment-shaped switching member 36. The latter has two slots 38, 39 for guide pins 41, 42 provided on the casing 40 of the shutter assembly. The switching member 36 has a projection or nose 43 which cooperates with a surface 44 of a tracking lever 45. The lever 45 is pivotable on the guide pin 41 of the casing 40 and has a tracking portion 46 which constitutes a follower and can be moved by a cam 48 rigid with a focussing member 47 which is adjustable by hand and has a knob 49. The distance between a stop 50 of the tracking lever 45 and a cam face 51 of the adjusting lever 10 determines the extent to which the adjusting lever 10 can be moved and hence the size of the diaphragm aperture.

The casing 40 of the shutter assembly supports a shutter blade 52 which is turnable on a pivot pin 53 and has a projection or extension 54. A reciprocable setting member or slide 55 is guided in bearings provided therefor in the housing H and is biased upwardly to a first position by a return spring 56. This slide 55 is moved downwardly to a second position in response to attachment of a multiple flash bulb holder 57 here shown as a customary "Flashcube" with four flash bulbs. The plug 57a of this multiple flash bulb holder is insertable into an indexible receptacle or socket (not shown) in the housing H in a manner well known from the art and forming no part of the present invention. The direction in which the slide 55 can be displaced to second position in response to insertion of the plug 57a is indicated by arrow e. The slide 55 carries a projection or arm 58 which can limit the extent of angular displacement of the shutter blade 52 to thus adjust the shutter assembly. This slide further carries a second arm 59 serving as an abutment for a pivotable mask 61 which is turnable on a pivot pin 60 and is biased against the arm 59 by a helical spring 63. The mask 61 can overlie different portions of the light-sensitive receiver 62 in the circuit of the exposure meter and determines the angular position of the needle 1 in a manner well known from the art of cameras. The mask 61 has a protuberance 64 which bears against the arm 59 of the slide 55 under the bias of the spring 63. The parts 59, 60, 61 and 63 constitute a third adjusting means which can adjust the sensitivity of the exposure meter.

FIG. 1 illustrates the components of the camera in positions they assume prior to depression of the release 14. The needle 1 is held in a position which is indicative of unsatisfactory intensity of scene light, i.e., close to one end of the range of its movement in the slot 2 of the back support 3. If the release 14 is depressed in response to finger pressure on the knob 16, the spring 11 is free to turn the sensing member 6 about the pin 5 in a counterclockwise direction (arrow $a$) whereby the edge face 7 engages the needle 1 and urges it against the edge face 4. The needle 1 is clamped between the edge faces 4, 7 and prevents further pivotal movement of the sensing member 6. The resetting lever 20 turns about the pin 19 (arrow $b$) in response to downward movement of the post 13 on the release 14 whereby its edge face 22 slides along the stop pin 23 of the adjusting lever 10 and ultimately moves beyond this stop pin so that the lever 10 is free to turn under the action of the spring 11. Since the angular movement of the sensing member 6 is rather small when the needle 1 assumes the position shown in FIG. 1 (because the intensity of scene light is below a predetermined minimum value), the follower 9 of the sensing lever travels in an arc above the serrated edge face 8 of the sensing member and along an arcuate guide face 8a of the sensing member. The direction of pivotal movement of the adjusting lever 10 is indicated by the arrow $c$. The nose 33 of the second adjusting lever 31 remains in abutment with the edge face 34 of the sensing member 6, i.e., the angular position of the second adjusting member 31 changes very little or not at all and the same applies for the switching member 36 which is coupled to the adjusting lever 31 by the slot and pin connection 35, 37. A spring 45a urges the surface 44 of the tracking lever 45 against the nose 43 of the switching member 36 and maintains the follower 46 of the tracking lever 45 in the path of movement of the cam 48 on the focussing member 47. Thus, and if the user moves the focussing member 47 through the intermediary of the knob 49, the tracking lever 45 is pivoted on the guide pin 41 due to engagement between the cam 48 and follower 46. The lever 45 can turn on the guide pin 41 in and counter to the direction indicated by arrow $d$.

When the edge face 22 of the resetting lever 20 moves past the stop pin 23, the adjusting lever 10 is free to follow the bias of the spring 11 and can turn in the direction indicated by arrow $c$. The cam face 51 of the adjusting lever 10 engages the stop 50 of the tracking lever 45 whereby the stop 50 limits the extent of angular displacement of the lever 10 and thus determines the size of the aperture defined by the diaphragm blades 29, 30 which are controlled by the lever 10 through the intermediary of the pin 25. The blades 29, 30 are pivotable in opposite directions. It will be seen that, when the intensity of scene light is unsatisfactory, the camera establishes an automatic connection between the range finder 47 and the adjusting lever 10 for the diaphragm blades 29, 30 through the intermediary of the second adjusting lever 31.

If the user inserts the plug 57a of a multiple flash bulb holder 57 into the receptacle or socket of the housing H, the slide 55 is moved downwardly (arrow e) against the opposition of its return spring 56 and moves the arm 58 downwardly. The user then depresses the knob 16 to move the release 14 downwardly and to release the shutter blade 52 which is biased by a suitable spring (not shown) tending to turn it on the pin 53 in a clockwise direction as indicated by the arrow f. The extent of such angular displacement of the blade 52 is limited by the arm 58 of the slide 55 when the latter assumes the first position shown in FIG. 1. However, when the slide 55 is moved downwardly to second position in response to attachment of multiple flash bulb holder 57, the arm 58 is moved away from the path of the projection 54 on the shutter blade 52 so that the latter can move through an angle of maximum magnitude and provides a relatively long exposure time which is satisfactory for exposures with flash illumination. A return spring or closing spring (not shown) then returns the blade 52 to the position shown in FIG. 1 to complete the exposure. The release 14 actuates a conventional synchronizing switch (not shown) of the built-in illuminating arrangement including the holder 57 when the blade 52 admits scene light through the aperture defined by the diaphragm blades 29, 30 so that one of the flash bulbs in the holder 57 is fired at a time when the shutter is open.

When the user removes the finger from the knob 16, the spring 15 moves the release 14 upwardly to return the flange 17 into abutment with the top wall 18. The post 13 entrains the projection 12 of the sensing member 6 and pivots the resetting lever 20 in a clockwise direction, as viewed in FIG. 1. The spring 11 stores energy and the adjusting lever 10 returns to the position shown in FIG. 1.

If the position of the needle 1 is indicative of satisfactory intensity of scene light, depression of the release 14 results in larger angular displacement of the sensing member 6 (arrow a) because the needle 1 is located nearer to the pivot pin 5 than in the position shown in FIG. 1. The edge face 34 of the sensing member 6 is then disengaged from the nose 33 of the second adjusting lever 31 whereby the latter turns in a clockwise direction under the bias of a spring 36a which acts upon the switching member 36. The latter's pin 37 extends into the slot 35 of the adjusting lever 31 and turns the lever 31 in a clockwise direction when the spring 36a is free to contract. The switching member 36 turns in the direction indicated by arrow g and its surface 44 bears against the projection 43 of the tracking lever 45 to turn the latter against the opposition of spring 45a so that the follower 46 moves away from the path of cam 48 on the focussing member 47. The stop 50 of the tracking lever 45 then moves into registry with a cutout or recess 10a of the adjusting lever 10.

Since the angular displacement of the sensing member 6 is relatively large, the serrated edge face 8 assumes such position with reference to the follower 9 of the adjusting lever 10 that the follower 9 bears against a portion of the edge face 8 whereby its position reflects the intensity of scene light as indicated by the position of the needle 1. The pin 25 adjusts the diaphragm blades 29, 30 so that the size of the diaphragm aperture is a function of the intensity of scene light.

If the multiple flash bulb holder 57 is detached from the socket in the housing H, the spring 56 maintains the slide 55 in the first position shown in FIG. 1. When the release 14 is depressed to the extent necessary to release the shutter blade 52, the projection 54 of the shutter blade 52 strikes against the lower arm 58 of the slide 55 so that the exposure time is shorter than when the holder 57 is attached to the camera. For example, the exposure time furnished by the shutter assembly including the blade 52 when the holder 57 is detached may be 1/125 of a second. When the user removes the finger from the knob 16, the spring 15 contracts and moves the shutter release 14 back to the position shown in FIG. 1. The spring 15 is stronger than the springs 11 and 36a so that the sensing member 6, adjusting levers 10 and 31 and the switching member 36 return to the positions shown in FIG. 1.

The user can also use the multiple flash bulb holder 57 for elimination of shadows when the exposure is made in satisfactory daylight, i.e., when the size of the diaphragm aperture is determined as a function of the intensity of daylight. By inserting the plug 57a of a holder 57 into the socket of the housing H, the user moves the setting member or slide 55 downwardly (arrow e) so that the arm 58 is moved away from the path of the projection 54 on the shutter blade 52. Thus, the shutter assembly is set to furnish a longer exposure time, namely, the same exposure time which is satisfactory for exposures with flash illumination of the subject or scene. Of course, such relatively long exposure time could lead to overexposure in satisfactory daylight; therefore, the slide 55 influences the exposure meter of the camera through the intermediary of its upper arm 59 which permits the spring 63 to contract and to pivot the mask 61 in a clockwise direction as indicated by the arrow h. The mask 61 then overlies a smaller portion of the light-sensitive surface on the receiver 62. The moving coil instrument reacts accordingly and causes a greater deflection of the needle 1. Thus, the sensitivity of the exposure meter is properly adjusted to account for the relatively long exposure time during operation in daylight and with additional illumination of the subject with light furnished by one of the flash bulbs in the holder 57.

FIG. 2 shows a reciprocable setting member or slide 65 which corresponds to the slide 55 of FIG. 1 and has and arm 66 which controls a switch including a moving contact 68 having a current-conducting head 67 normally bearing against a similar head 69 on a stationary contact 70. When he switch including the contacts 68, 70 is closed, a resistor 71 is connected in the electric circuit of the exposure meter which includes a moving coil instrument 72 having an output member or needle 73, a battery 74 or an analogous source of electrical energy, and a light-sensitive resistor 75. The parts 74, 75 can be replaced by a photosensitive cell. When the slide 65 is moved in the direction indicated by arrow i, i.e., when the user decides to attach a multiple flash bulb holder, the arm 66 opens the switch 67–70 by moving the contact 68 away from the contact 70 whereby the resistor 71 is disconnected from the circuit of the exposure meter. The switch including the contacts 68, 70 replaces the mask 61 of FIG. 1 in that it can influence the sensitivity of the exposure meter 72–75 to account for longer exposure time when the camera is used in daylight and the holder 57 is attached to furnish artificial light in addition to daylight. The sensitivity of the exposure meter is then changed in a sense to reduce the size of the diaphragm aperture because the needle 73 assumes a position which is indicative of higher intensity of scene light than when the holder 57 is detached even though the intensity is unchanged.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

What is claimed is:

1. In a photographic camera, a combination comprising adjustable-sensitivity exposure meter means having an output portion moveable between a plurality of positions as a function of the intensity of scene light; shutter and diaphragm assemblies, at least one of said assemblies being adjustable to furnish a range of respective exposure values; sensing means movable into engagement with said output portion; first adjusting means controlled by said sensing means and operative to adjust said adjustable assembly as a function of the intensity of scene light when such intensity exceeds a pretedermined value; focussing means; second adjusting means controlled by said sensing means and operative to establish a connection between said focussing means and said adjustable assembly when the intensity of scene light is below said predetermined value; setting means movable from a first position to a second position to thereby adjust one of said assemblies; illuminating means having a portion movable to an operative position to thereby move said setting means to second position; and third adjusting means for adjusting the sensitivity of said exposure meter means in response to movement of said setting means to second position.

2. A combination as defined in claim 1, wherein said second adjusting means is operative to establish a connection between said focussing means and said diaphragm assembly and wherein said setting means is arranged to adjust said shutter assembly so that the latter furnishes a predetermined exposure time in response to movement of said setting means to second position.

3. A combination as defined in claim 1, wherein said one adjustable assembly is said diaphragm assembly.

4. A combination as defined in claim 1, wherein said exposure meter means comprises an electric circuit and said third adjusting means comprises resistor means normally connected in said circuit and means for disconnecting said resistor means in response to movement of said setting means to second position.

5. A combination as defined in claim 1, wherein said exposure meter means comprises a light-sensitive receiver and said third adjusting means comprises a mask and means for moving said mask with reference to said receiver so that the mask overlies different portions of said receiver in the first and second positions of said setting means.

6. A combination as defined in claim 2, wherein said setting means comprises a member reciprocable between said first and second positions and means for urging said member to first position, said portion of said illuminating means being attachable to and detachable from a receptacle provided therefor in the camera to move said member to second position in response to attachment to said receptacle.

7. A combination as defined in claim 6, wherein said illuminating means is a flash unit and said portion thereof is a multiple flash bulb holder.

8. A combination as defined in claim 6, wherein said member of said setting means comprises a projection forming part of said third adjusting means.

9. A combination as defined in claim 1, further comprising release means operative to release said shutter assembly and to initiate movement of said sensing means into engagement with said output portion.

10. A combination as defined in claim 1, wherein said first adjusting means comprises a lever pivotable about a fixed axis and having follower means arranged to track portions of said sensing means.

References Cited

UNITED STATES PATENTS

| | | | |
|---|---|---|---|
| 3,204,541 | 9/1965 | Frost et al. | 95—11.5 XR |
| 3,205,802 | 9/1965 | Wareham | 95—11.5 |
| 3,220,328 | 11/1965 | Jakob et al. | 95—11.5 |
| 3,326,103 | 6/1967 | Topaz. | |
| 3,433,138 | 3/1969 | Burgarelca. | |
| 3,433,144 | 3/1969 | Ivester. | |

NORTON ANSHER, Primary Examiner

JOSEPH F. PETERS, Jr., Assistant Examiner

U.S. Cl. X.R.

95—64, 11.5